(12) United States Patent
Navarro (10) Patent No.: US 7,156,262 B2
(45) Date of Patent: Jan. 2, 2007

(54) SANITARY FILL VALVE ASSEMBLY WITH ADJUSTABLE FLOW REGULATOR

(76) Inventor: Ramon M. Navarro, 4829 E. Walnut Ave., Orange, CA (US) 92869

( * ) Notice: Subject to any disclaimer, the term of this patent is extended or adjusted under 35 U.S.C. 154(b) by 125 days.

(21) Appl. No.: 10/661,479

(22) Filed: Sep. 15, 2003

(65) Prior Publication Data

US 2005/0056659 A1   Mar. 17, 2005

(51) Int. Cl.
   *G01F 11/00*   (2006.01)

(52) U.S. Cl. .......................... 222/256; 222/1; 222/262; 222/309; 222/380; 222/504

(58) Field of Classification Search ................ 222/256, 222/262, 309, 1, 544, 504, 434, 253, 559, 222/260, 267, 380; 141/90, 260, 258, 262
See application file for complete search history.

(56) References Cited

U.S. PATENT DOCUMENTS

| | | | |
|---|---|---|---|
| 2,012,319 A | 8/1935 | Pittlick | |
| 2,740,556 A | 4/1956 | Baron | |
| 2,923,443 A * | 2/1960 | Sundholm | 222/380 |
| 3,865,281 A | 2/1975 | Byrd et al. | |
| 4,437,498 A * | 3/1984 | Pankratz et al. | 141/89 |
| 4,840,014 A | 6/1989 | Takehana et al. | |
| 4,939,890 A | 7/1990 | Peronek et al. | |
| 5,137,187 A * | 8/1992 | Nichols et al. | 222/504 |
| 5,327,697 A | 7/1994 | Kent | |
| 5,407,102 A | 4/1995 | Freudinger et al. | |
| 5,501,253 A | 3/1996 | Weiss | |
| 5,957,343 A | 9/1999 | Cavallaro | |
| 6,085,943 A * | 7/2000 | Cavallaro et al. | 222/309 |
| 6,135,167 A | 10/2000 | Kiholm | |
| 6,276,409 B1 | 8/2001 | Ellison | |
| 6,338,370 B1 | 1/2002 | Edwards et al. | |

* cited by examiner

*Primary Examiner*—Frederick C. Nicolas
(74) *Attorney, Agent, or Firm*—William D. Breneman, Esq.; Breneman & Georges (57) ABSTRACT

A sanitary fill head and sanitary fill head assembly for dispensing viscous flowable materials including a housing having an inlet passage for receiving the viscous flowable material and an outlet passage from which the viscous flowable material is dispensed, a product dispenser for dispensing the viscous flowable material from the outlet passage, and a product flow regulator for adjustably regulating the rate of flow of the viscous flowable material into the chamber to accommodate viscous flowable materials having different physical properties.

17 Claims, 7 Drawing Sheets

SANITARY FILL VALVE ASSEMBLY WITH ADJUSTABLE FLOW REGULATOR

BACKGROUND OF THE INVENTION

1. Field of the Invention

This invention relates to an open or closed sanitary fill valve assembly for the rapid and efficient dispensing or otherwise filling of containers, vessels or the like with a viscous flowable material. The novel open or closed fill valve assembly includes an adjustable product flow regulator for regulating the rate of flow of the viscous flowable material into a dispensing chamber of the fill valve assembly.

2. Description of the Related Art

Container filling machines are used in sanitary filling operations for dispensing in food product container packaging lines to quickly fill large numbers of containers. The efficient and reliable operation of the filling valves of these filling machines is critical to the process. Historically, the rapid and exact economical filling of containers has been an object of a large number of devices. Container filling machines have evolved over the years from simple mechanisms to complex devices, yet with many features evolving and improving over time.

For example, U.S. Pat. No. 3,865,281 to Byrd et al. discloses an apparatus for filling containers comprising a housing having a chamber, an inlet conduit, and a nozzle for dispensing the liquid, a control valve spool sealed within the chamber for vertical movement therein, a drive mechanism for the driving spool, and a mechanically-driven piston assembly for varying the amount of product dispensed into the containers.

U.S. Pat. No. 5,957,343 to Cavallaro discloses a controllable liquid dispensing system including a material control device comprising a piston and a screw which is rotated to longitudinally displace the piston toward a dispensing chamber to create a vacuum therein and permit a predetermined amount of liquid to flow into the chamber.

Heretofore, none of the sanitary fill valves are effective in providing rapid and efficient dispensing of precise amounts of viscous flowable material into a container. Specifically, none of the sanitary fill valves disclosed in the prior art provides for an open or closed or ON/OFF valve with an adjustable regulation of the flow rate of a flowable viscous material at a point between the inlet channel and the valve chamber. Moreover, none of the sanitary fill valves disclose an adjustable regulator that adjusts the flow rate in relation to physical characteristics such as density, pump pressure, viscosity, compressibility, etc. of the viscous flowable materials. The fill valves of the prior art also permit turbulent flow of the viscous flowable material once inside the valve chamber which results in splashing and/or bubble formation during dispensation. Furthermore, the fill valves of the prior art facilitate effective cleaning-in-place of the outlet or discharge area during a dispensing operation.

SUMMARY OF THE INVENTION

It is an object of the invention to provide a sanitary fill valve assembly that provides for the rapid ON/OFF dispensing of a viscous flowable material into the interior space of vessels, containers or the like.

It is another object of the invention to provide such a sanitary fill valve assembly that efficiently dispenses and meters a predetermined amount of viscous flowable material by utilizing an adjustable flow regulator to accommodate variations in the physical characteristics of the dispensed fluid.

It is an additional object of the invention to provide such a sanitary fill valve assembly that reduces turbulent flow to permit the dispensing and metering of dispensed viscous flowable material during to without dripping, splashing, sloshing or bubble formation.

It is a further object of the invention to provide such a sanitary fill valve assembly adaptable to positively and adjustably regulate the flow rate of viscous flowable materials for the precise metering during a dispensing operation by reducing and/or increasing the flow area into the valve chamber.

It is yet another object of the invention to provide such a sanitary fill valve assembly that facilitates effective cleaning-in-place of the discharge area during a dispensing operation.

It is still another object the invention to provide for the individual calibration of a sanitary fill valve with respect to a plurality of sanitary fill valves in a sanitary mechanized filling operation.

The present invention provides for a sanitary fill valve having ON/OFF capabilities with an adjustable flow rate control to permit accurate filling by accommodating for the physical characteristics or properties of the dispensed fluid such as temperature, viscosity, density, pumping pressure, etc. while at the same time providing for the calibration of each one of a plurality of sanitary fill valves with respect to each other in a sanitary mechanized filling operation.

In accordance with these objects and the principles of the invention, a sanitary fill valve assembly is herein provided for precisely filling an interior cavity of a vessel with a viscous flowable material without undue turbulence, frothing and agitation of the viscous flowable material. Such an assembly includes: (a) a housing having an inlet passage for receiving a viscous flowable material from a viscous flowable material source, an annular chamber for receiving the viscous flowable material from the inlet passage, and an outlet passage from which the viscous flowable material is dispensed; (b) an ON/OFF positive controlled product dispenser for dispensing the viscous flowable material from the chamber; and (c) a product flow regulator for adjustably regulating the rate of flow of the viscous flowable material into the chamber, the regulating mechanism being disposed in a flow path between the inlet passage and the chamber to at least one of reduce and increase the flow area at the flow path.

The present invention is also directed to a sanitary fill valve including: (a) a housing having an inlet passage, an outlet passage and an annular chamber aligned in series to create a flow path for permitting receiving and dispensing of a viscous flowable material; (b) an ON/OFF product dispensing piston disposed within the chamber and adapted to rapidly reciprocate between a first position opening the chamber and a second position closing the chamber to dispense the viscous flowable material therefrom; (c) an actuator for displacing the product dispensing piston between the first and second positions; and (d) a product flow regulator disposed between the inlet passage and the chamber for adjustably regulating the flow rate of the viscous flowable material before entry into the chamber by at least one of reducing and increasing the flow area into the chamber to accommodate viscous flowable materials having different physical properties such as temperature, viscosity, density, pumping pressure, etc.

The present invention is also directed to a sanitary fill valve including a housing having an annular flow path through which a viscous flowable material is received and dispensed; a product dispenser disposed within the housing for dispensing the viscous flowable material therefrom; and a product flow regulator disposed in the flow path for adjustably regulating the flow rate of the viscous flowable material by at least one of reducing and increasing the flow area before dispensation to accommodate viscous flowable materials having different physical properties such as temperature, viscosity, density, pumping pressure, etc.

The present invention is further directed to a sanitary fill valve including: (a) a valve housing having an inlet passage for receiving a viscous flowable material from a viscous flowable material source, an annular chamber in communication with the inlet passage, and an outlet passage in communication with the chamber for dispensing the viscous flowable material into the vessel; (b) a product dispenser disposed within the annular chamber for drawing the viscous flowable material into the chamber and dispensing the viscous flowable material from the chamber; (c) a sealing mechanism for positively sealing the product dispenser within the chamber, wherein the seal mechanism is also adapted to facilitate cleaning-in-place of the outlet during dispensation; and (d) a product flow regulator in communication with the chamber for adjustably regulating the rate of flow of the viscous flowable material into the chamber by reducing and/or increasing a flow area into the chamber to accommodate viscous flowable materials having different physical properties such as temperature, viscosity, density, pumping pressure, etc.

The present invention is also directed to a process for hygienically filling a container, including steps of: (a) pumping a liquid product through an inlet into a chamber of a housing; (b) adjustably regulating the flow rate of the liquid product before entry into the chamber by at least one of reducing and increasing the flow area into the chamber to accommodate viscous flowable materials having different physical properties such as temperature, viscosity, density, pumping pressure, etc.; and (c) dispensing the liquid product by pneumatically operating a product dispenser to reciprocate the product dispenser between a first position opening the chamber and a second position closing the chamber to permit dispensing of the liquid product therefrom.

The product flow regulator may include a regulator body sized for receipt into an upper opening in the valve housing for displaceable movement therethrough. A tip portion of the regulator body combines with a corner sidewall portion of the inlet channel to create a flow passage or channel through which a viscous flowable material may flow into the fill valve chamber. The adjustable regulator body is disposed at the inlet channel to obstruct or impede the flow path of the viscous flowable material towards the valve chamber. This serves to positively adjust the flow rate of the viscous flowable material by either reducing or increasing the flow area into the valve chamber to accommodate viscous flowable materials having different physical properties such as temperature, viscosity, density, pumping pressure, etc. The adjustable regulator body may be adjustably displaced via a threaded screw and adjustment nut arrangement which provides for enhanced control during dispensation.

The sanitary fill valve and sanitary fill valve assembly in accordance with the present invention are advantageous in being adaptable to quickly and efficiently deliver or otherwise dispense and meter precise or uniform quantities of viscous flowable materials into an interior cavity of a vessel, container or the like. The fill valve and fill valve assembly is also advantageous in reducing turbulent flow to thereby permit dispensing of the viscous flowable material without unwanted splashing or gaseous bubble formation. The fill valve and fill valve assembly is further advantageous in providing for efficient and quick dispensing operations in automatically regulating the rate of flow of dispensed viscous flowable materials. The fill valve and fill valve assembly is even further advantageous in providing a sealed piston assembly which positively seals the piston within the housing while also cleaning-in-place the outlet passage to thereby reduce undesirable dripping of the dispensed viscous flowable materials.

BRIEF DESCRIPTION OF THE DRAWINGS

The advantages of the invention will become more apparent to those skilled in the art in conjunction with the detailed description of the preferred embodiments of the invention, in which.

DESCRIPTION OF THE PREFERRED EMBODIMENTS

Figure 1:
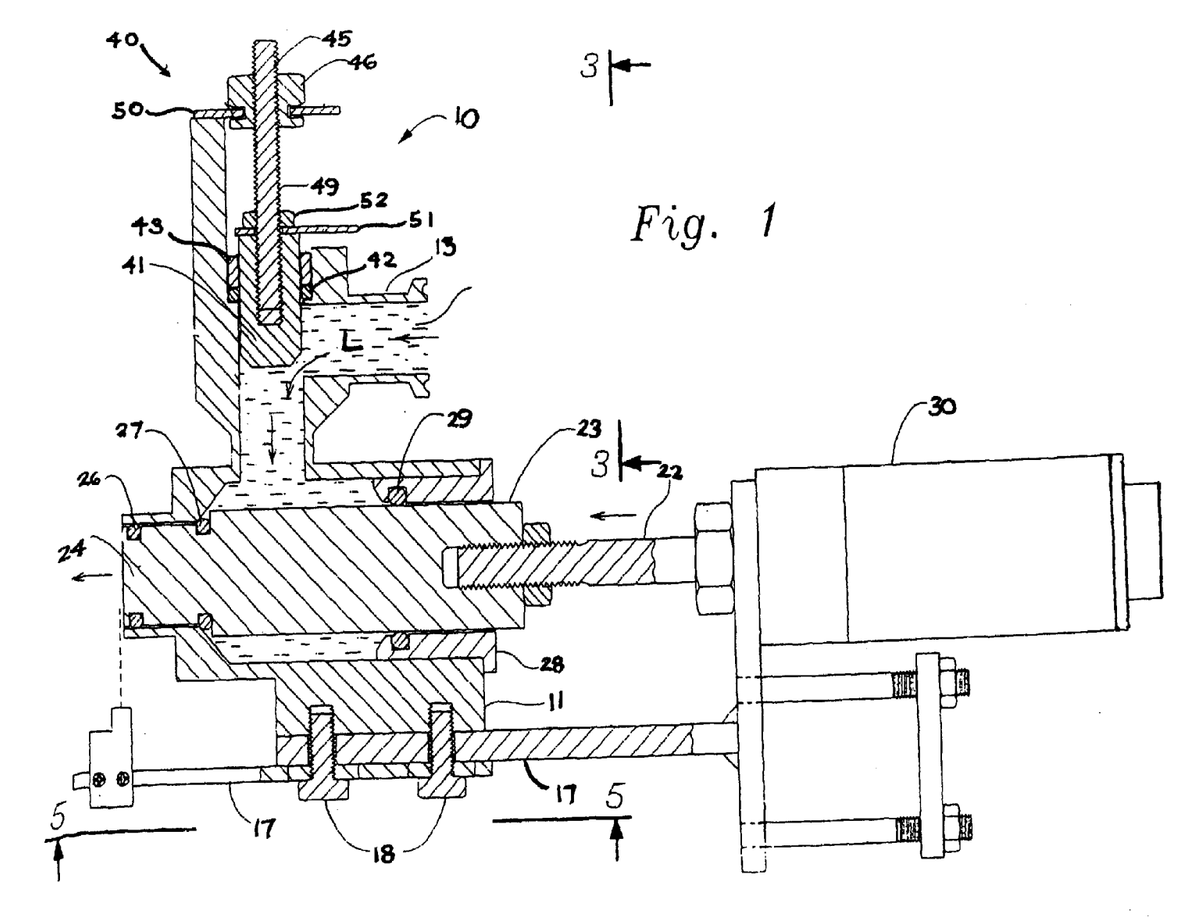
FIG. 1 is a front elevational view partly in section of the novel sanitary fill valve assembly with the piston in a closed or dispensing position.
Figure 2:
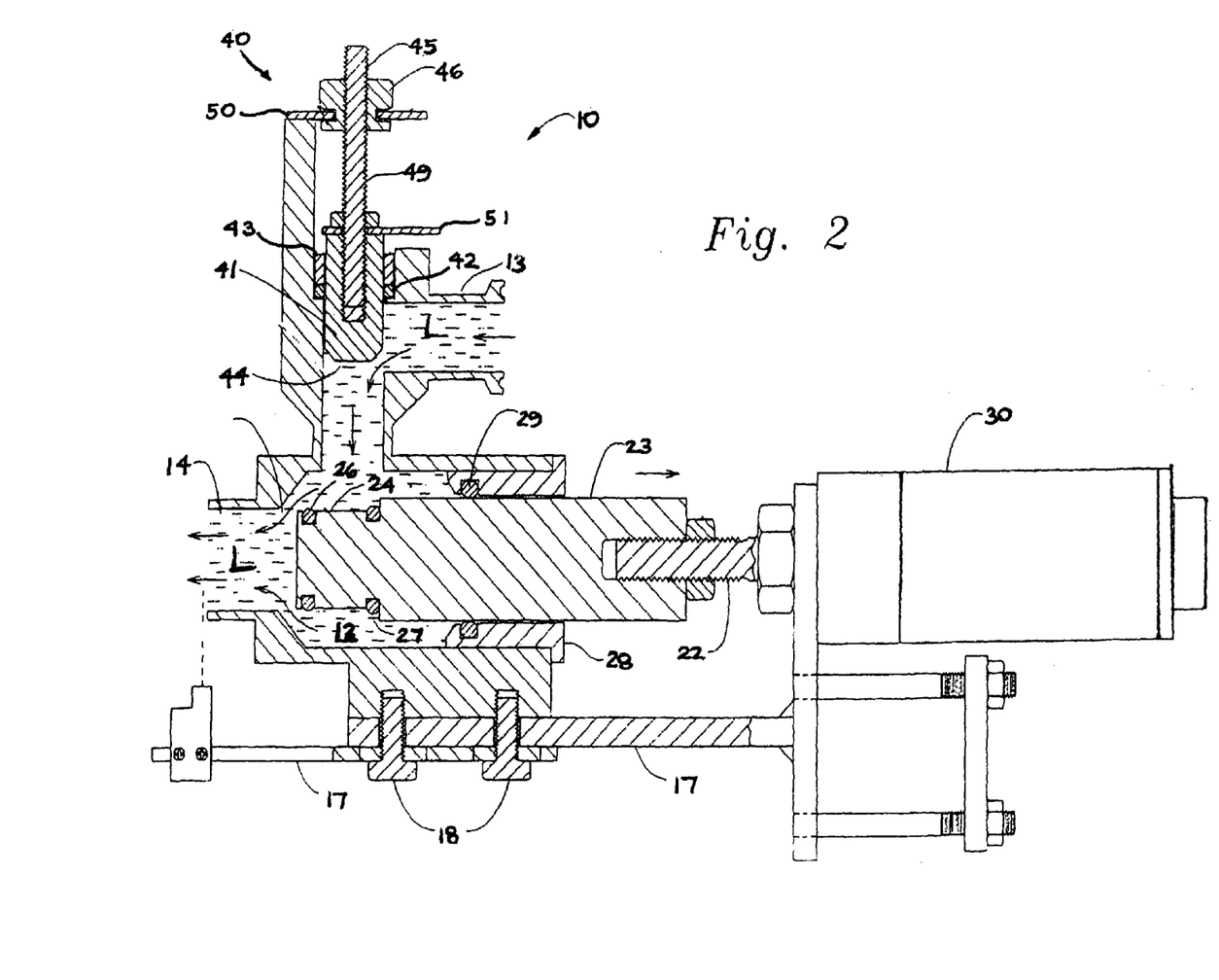
FIG. 2 is a front elevational view partly in section of the novel sanitary fill valve assembly with the piston in an open position.
Figure 3:
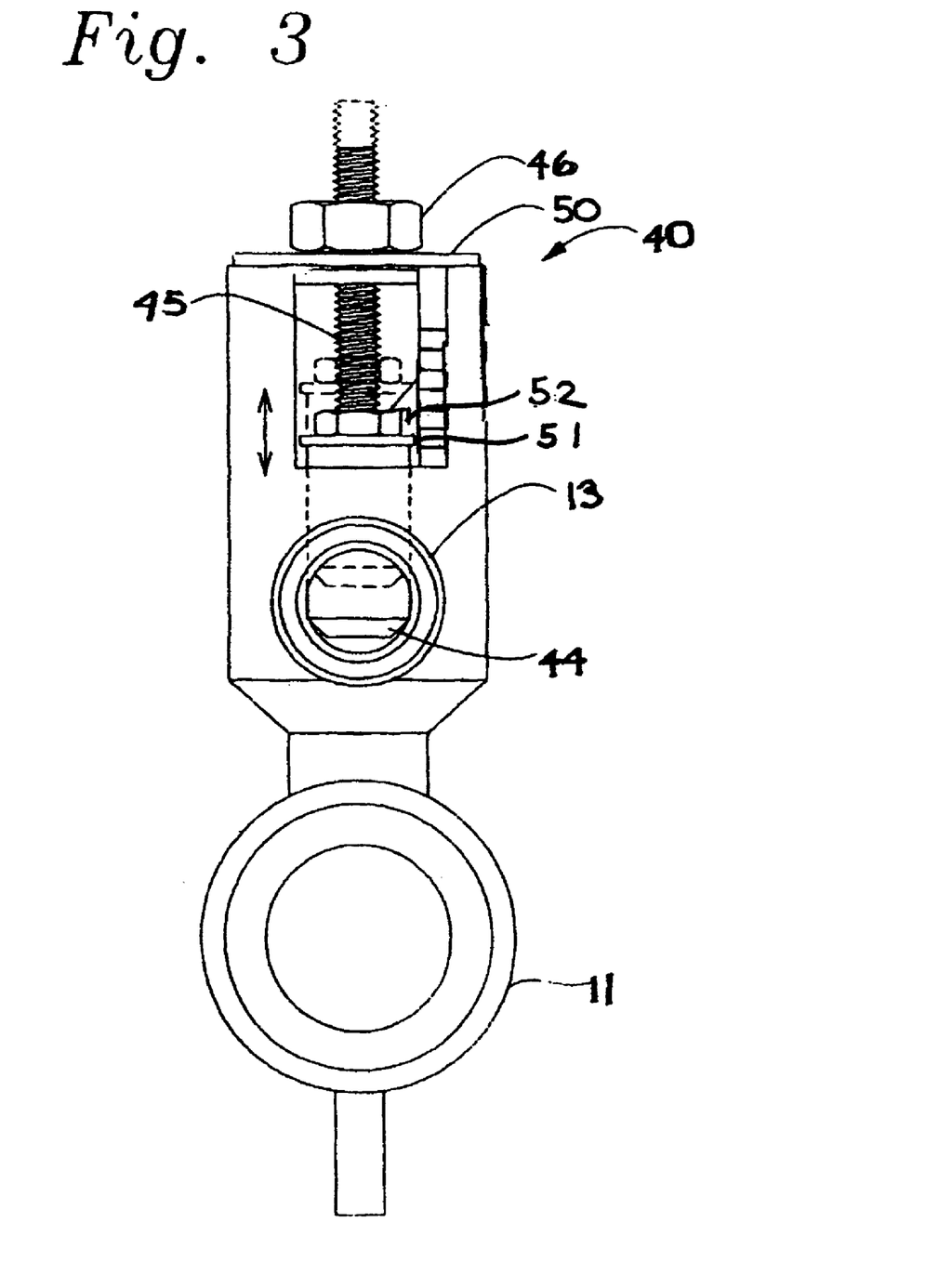
FIG. 3 is a side view of the product regulator taken along line 3—3 in FIG. 1.

Referring now to FIG. 1, which illustrates an ON/OFF sanitary fill valve assembly 10 in accordance with the present invention adapted to rapidly and efficiently deliver or otherwise dispense a precise or uniform quantity of viscous flowable material into the interior cavity of a vessel, container or the like 19 requiring hygienic and sanitary dispensation of the viscous flowable material. Typically, the fill valve assembly 10 is adapted for use in a mechanized in-line filling operation that utilizes a plurality of sanitary fill valves to dispense a large variety of viscous flowable materials having a wide range of viscosities and densities, including food products such as sauces, water, cooking oils, dairy products, beverages and the like, medical products and pharmaceutical preparations. Accordingly, the sanitary fill valve assembly 10 in accordance with the invention is adapted to dispense a controlled and/or metered volume of any viscous flowable material that is desired for delivery into a container.

The sanitary fill valve assembly 10 includes a fill valve housing 11 adapted to receive a viscous flowable material, i.e., liquid product L, from a liquid product source (not shown). A product dispenser 20 is provided for controllably discharging or otherwise dispensing the liquid product from the fill valve housing 11, including an actuator 30 for driving or otherwise actuating the product dispenser 20. A product flow regulator 40 is also provided for selectively controlling, regulating or otherwise adjusting the rate of flow of the liquid product L to the annular chamber 12 of the fill valve housing 11. While the fill valve assembly 10 in accordance with the invention is intended for use in association with a filler device (not shown) for rapidly and efficiently filling the interior spaces of vessels, containers or the like with a liquid product, it is foreseeable that the fill valve assembly 10 may also be used in applications which require the rapid and efficient dispensing of a viscous flowable material on various items other than vessels containers or the like.

Referring now to FIGS. 1–4, in addition to chamber 12, the fill valve housing 11 includes an inlet passage or channel 13 in communication with a liquid product source (not shown) for receiving the liquid product L and permitting such liquid product to flow into the chamber 12, and an outlet passage or channel 14 positioned downstream of the chamber 12 for permitting the dispensing of the liquid product L into a container. The liquid product L flows through the valve housing 11 as indicated by the arrows. The inlet channel 13 forms a right-angled elbow to permit flow of the liquid product L into the chamber 12. Thus, the chamber 12, inlet channel 13 and outlet channel 14 are aligned in series to form a flow path through which the liquid product L is received and dispensed. The outlet channel 14 may be configured in a variety of ways depending upon the physical characteristics of the liquid product L. For instance, the outlet channel 14 may include a plurality of channels, the number and size of which are related to the viscosity of the liquid product L.

While the valve housing 11 is shown mounted to the in line filling assembly via a plurality of bracket 17 and bolts 18, it is apparent that various fastening devices known in the art may alternatively be used to accomplish this task.

Figure 4:
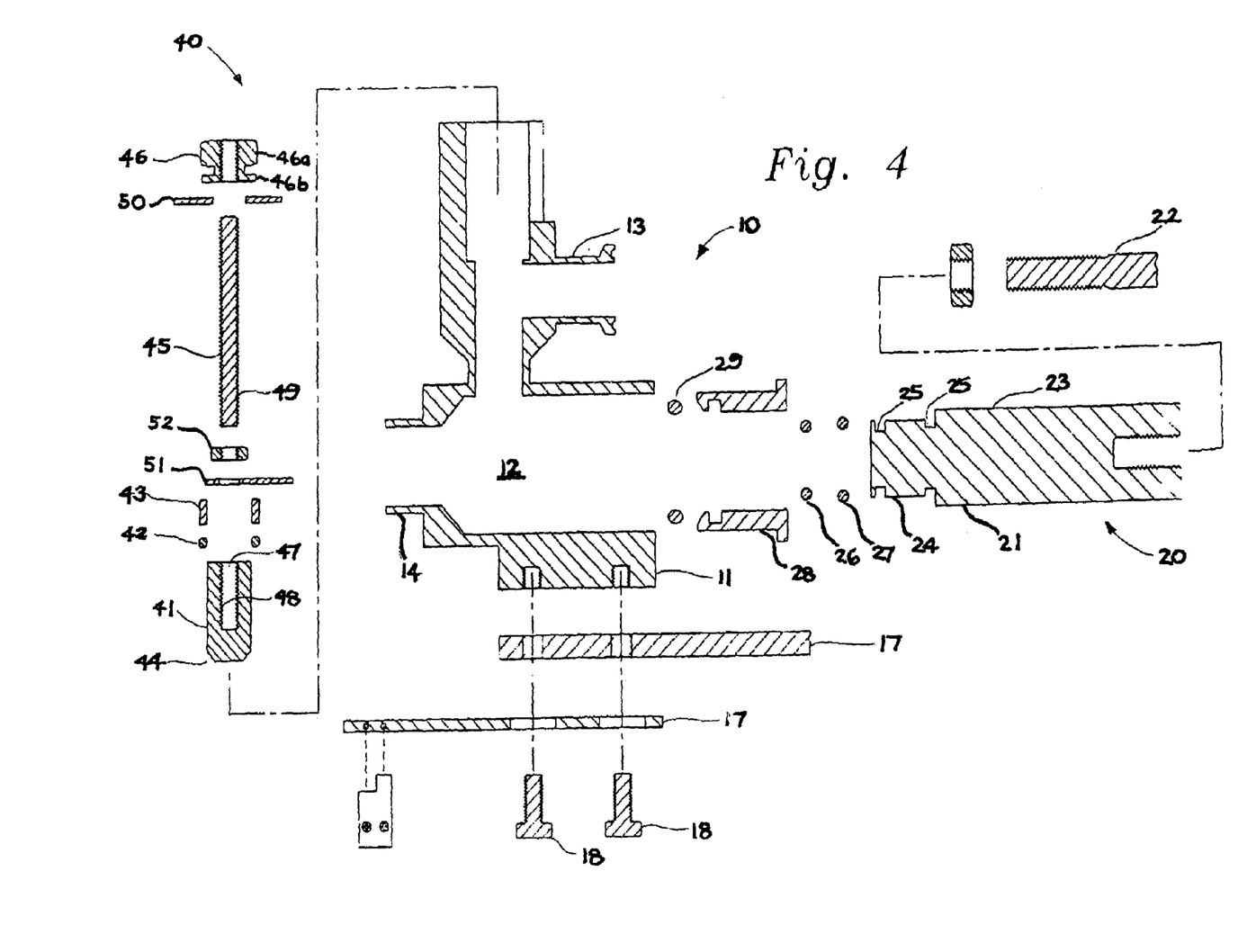
FIG. 4 is an exploded view of the novel sanitary fill valve assembly of FIG. 1.

As best illustrated in FIG. 4, the housing 11 has at an upper end thereof an opening into which a piston cylinder 21 is received for longitudinal movement therethrough. The inner wall of the housing 11 at a lower end thereof is tapered adjacent the outlet channel 14 to facilitate rapid dispensing of the liquid food product L from the chamber 12.

It is preferred that the valve housing 11 is composed of a material that exhibits good corrosion resistance and provides for the highest purity and hygienic standards for the sanitary dispensing of viscous flowable materials. Most preferably, the valve housing 11 is composed of a high-grade stainless steel that is without seams, threads, welds or other surface defects or imperfections that would permit the accumulation or accretion of undesirable particles that would result in the contamination of the dispensed product.

Figure 7:
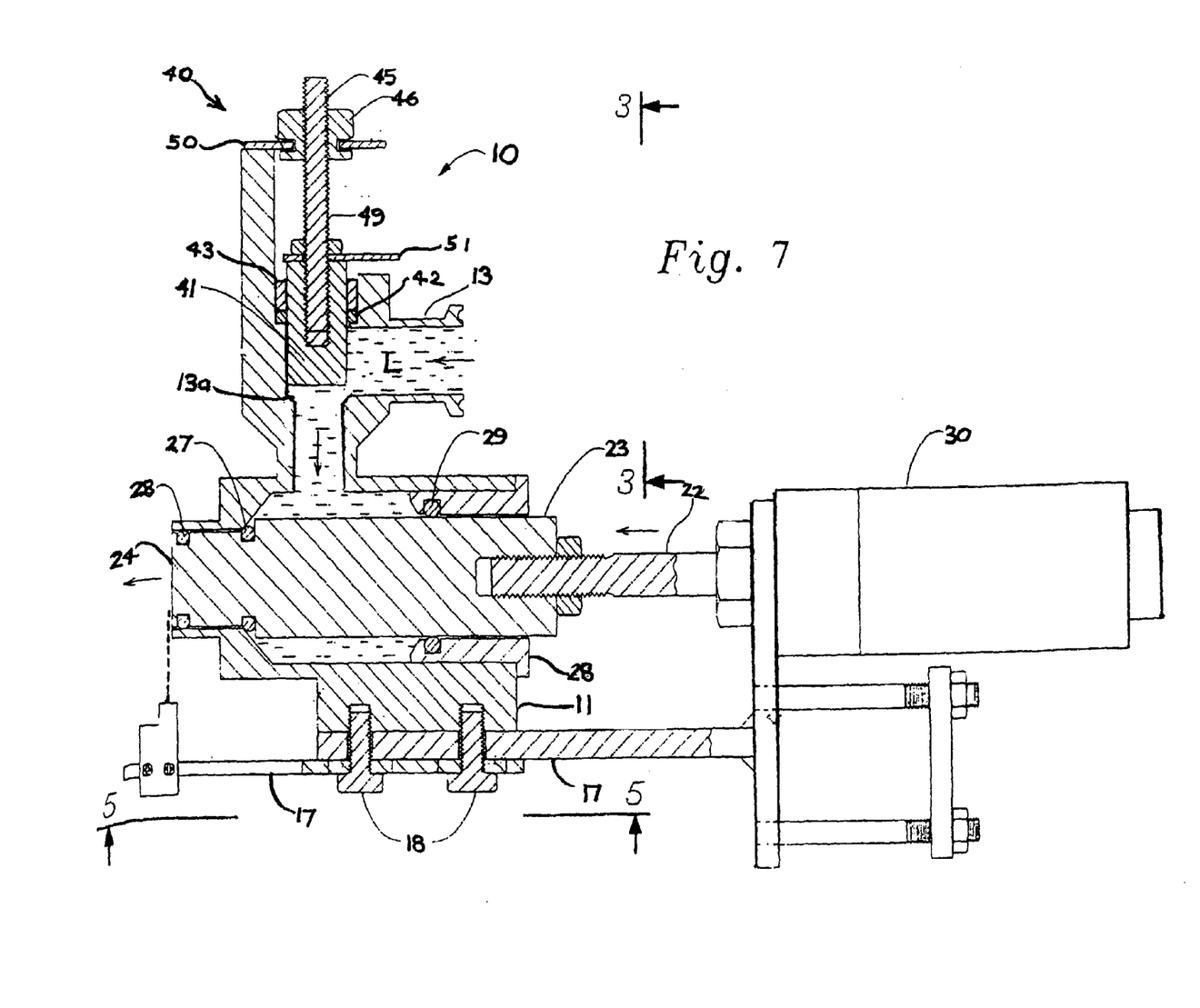
FIG. 7 is a front elevational view partly in section illustrating a further embodiment of the novel sanitary fill valve assembly in accordance with the invention.

The product flow regulator 40 has a regulator body 41 sized for receipt into an upper opening in the valve housing 11 and sealed therein by a seal member 42 and retainer 43 for displaceable movement therethrough. As illustrated in FIG. 4, a tip portion 44 of the regulator body 41 is substantially conical-shaped and combines with a corner sidewall portion of the inlet channel 13 to create a flow passage or channel through which the liquid product L flows into the valve chamber 12. This feature is advantageous in minimizing turbulent flow into the chamber 12 to prevent undesirable splashing and gas bubble formation during a dispensing operation. This is further advantageous in maintaining consistent flow rates of the liquid product L, and thus, more rapid and precise dispensing of the liquid product L. Note that the tip portion 44 of the regulator body may alternatively be provided with any geometric shape or combinations thereof which permit effective flow rate control during dispensation. Such an alternative design is illustrated in FIG. 7, in which the tip portion 44 of the regulator body 41 has a substantially rectangular shape while the wall of the inlet passage 13 is tapered.

The regulator body 41 is disposed in the path of flow in the inlet channel 13 to positively adjust the flow rate of the liquid product L by reducing and/or increasing the flow area into the chamber 12 in relation to the varying physical characteristics (as temperature, viscosity, density, pumping pressure, etc.) of the liquid product L. This provides additional protection against sloshing, dripping and undue turbulence. This is particularly advantageous where liquid products L of varying physical characteristics such as density, pump pressure, viscosity, compressibility, etc. are dispensed in a mechanized sanitary filling operation which utilizes a plurality of sanitary fill valves 11 since the adjustability of the regulator body 41 can be used to control the rate of flow and the amount of liquid product being dispensed in individual sanitary fill valves 11 in relation to the aforementioned physical characteristics.

The tip portion 44 extends downwardly towards the chamber 12 while an internal area defining an opening 47 containing engagement teeth 48 which receive and mate with the outer threads 49 of a screw 45. The regulator body 41 is adjustably displaced via a threaded screw 45 and adjustment nut 46 arrangement that provides for enhanced control of the regulator body 41.

In a preferred embodiment of the invention, a regulator body 41 having a diameter of about 0.5 inches to about 6 inches is used. However, smaller or larger diameters may be used depending upon the particular requirements. It is preferred that the regulator body 41 is composed of any self-lubricating, abrasive-resistant, rust-resistant and hygienic material. Most preferably, a material such as stainless steel is utilized to form the regulator body 41.

(Marked-up Copy) The displacement distance of the regulator body 41 at the inlet channel 13 is controlled by the number of turns made to the adjustment nut 52 located on the screw 49. Accordingly, by adjusting the opening of the regulator body 41 with the screw 49 and adjustment nut 52 arrangement, the required flow rate is set, particularly, the flow area at the inlet channel 13 is decreased. Specifically, controlling the distance of displacement of the regulator body 41 serves to increase and/or decrease the flow area at the flow path between the inlet channel 13 and the chamber 12. Moreover, a feature for limiting the longitudinal movement of the regulator body 41 is provided by way of stop means 51 situated between the adjustment nut 52 and the regulator body 41. A second adjustment nut 46 is provided at the distal end of screw 49 and is rotated in a direction counter to the rotation of adjustment nut 52 to displace the regulator body 41 in an upward direction relative to the inlet channel 13, i.e., increasing the flow area at the inlet channel 13. A washer 50 is supported by the valve housing 11 and is situated between a space or gap created by the main body 46a and the lower portion 46b of the adjustment nut 46 and serves to abut or otherwise rest on a portion of the housing 11. Stop means 51 is situated between a distal upper end portion of the regulator body 41 and a washer 52 and may abut or otherwise rest on another portion of the housing 11. Hence, when the adjustment nut 52 is rotated about screw 49, stop means 51 contacts the housing 11, and thus, limits the distance from which the regulator body 41 adjustably extends towards the chamber 12. The distance of displacement may be determined manually by measuring the distance between the washer 50 and stop means 51. Accordingly, the adjustment of the flow area serves to determine the rate of flow of the liquid product L as well as the volume of liquid product L drawn into the chamber 12. While the product flow regulator 40 is shown to be manually actuated using the screw 49 and adjustment nut 52 arrangement, such adjustment may be performed electronically using any electronic actuator known in the art. Such alternative actuators may include a pneumatic actuator, an electromagnetic actuator or the like.

The product dispenser 20 includes a piston assembly having a piston cylinder 21 and piston rod 22 driven or otherwise actuated by the actuator 30 for reciprocating movement in the chamber 12 between a first position drawing the liquid product L into the chamber 12 and a second position discharging the liquid product L from the chamber 12 into a vessel. The piston body 21 has a main section 23 disposed within the upper section of housing 12 and a substantially conical-shaped lower head portion 24 sized for receipt into the outlet channel 14. The lower head portion 24 is smaller in diameter than the main section 23 and is provided at an outer periphery thereof with a pair of channels 25 for receiving a pair of seal members 26, 27 which positively seals the piston body 21 in the chamber 12 to thereby prevent leakage of the dispensed liquid product L during dispensation. The piston 21 is also sealed in the chamber 12 at the upper end of the housing 11 using a cylindrical bushing 28 and an upper seal member 29. The bushing 28 is press fit into the opening at the upper end of the valve housing 11 while the upper seal member 29 is retained in an inner circumferential space of the bushing 28 to form a tight seal between piston body 21 and the valve housing 11. The lower seal members 26, 27 are retained on the piston body 21 by the channels 25 respectively to slidably seal piston body 21 within the chamber 12 of the housing 11. Seal member 26 serves a dual purpose in facilitating the cleaning-in-place of the valve housing 11 by wiping the inner wall of the outlet channel 14 by friction and impulsing the liquid product L to separate therefrom. This is advantageous in reducing unsanitary spilling and dripping of the dispensed liquid product L through the outlet channel 14.

It is preferred that the bushing 28 is composed of a polymeric material that provides a low friction coupling between the piston body 21 and the valve housing 11, and meets the standards for sterilization set by the FDA. Most preferably, a high-grade silicone or polyurethane material is utilized to form the bushing 28. Most preferably, a composition of Delrin® or Teflon® may be utilized to form the bushing 28.

The upper end of the piston body 21 is a cavity having internal threads for receiving and mating with a plurality of outer threads of the piston rod 22. The upper end of the piston rod 22 is connected to the actuator 30 to transmit a force sufficient (i.e., in a range between ______) to rapidly reciprocate the piston body 21 between the first position and the second position.

Figure 5:
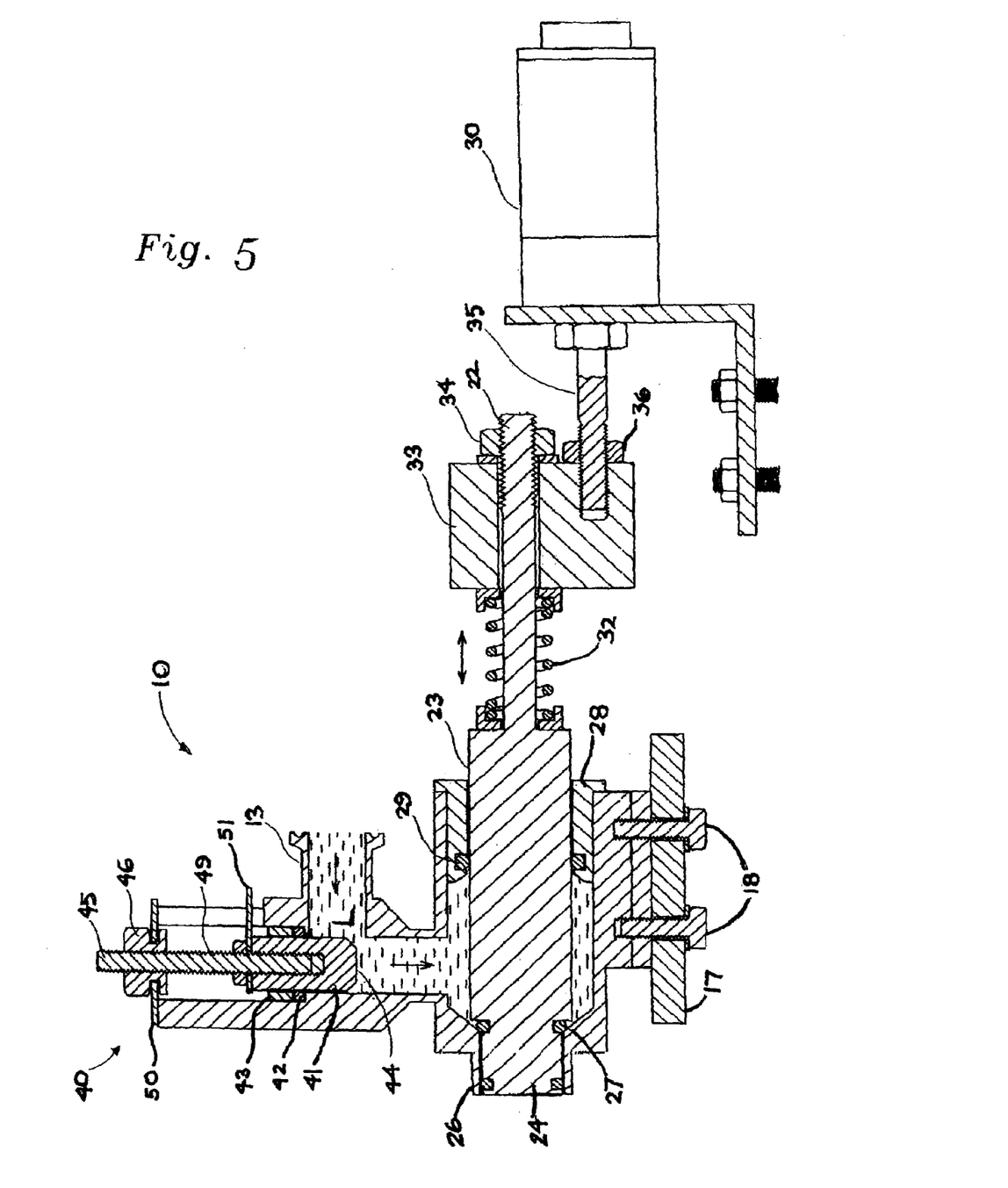
FIG. 5 is a front elevational view of the novel sanitary fill valve assembly with the piston in a closed or dispensing position in accordance with another embodiment of the invention.
Figure 6:
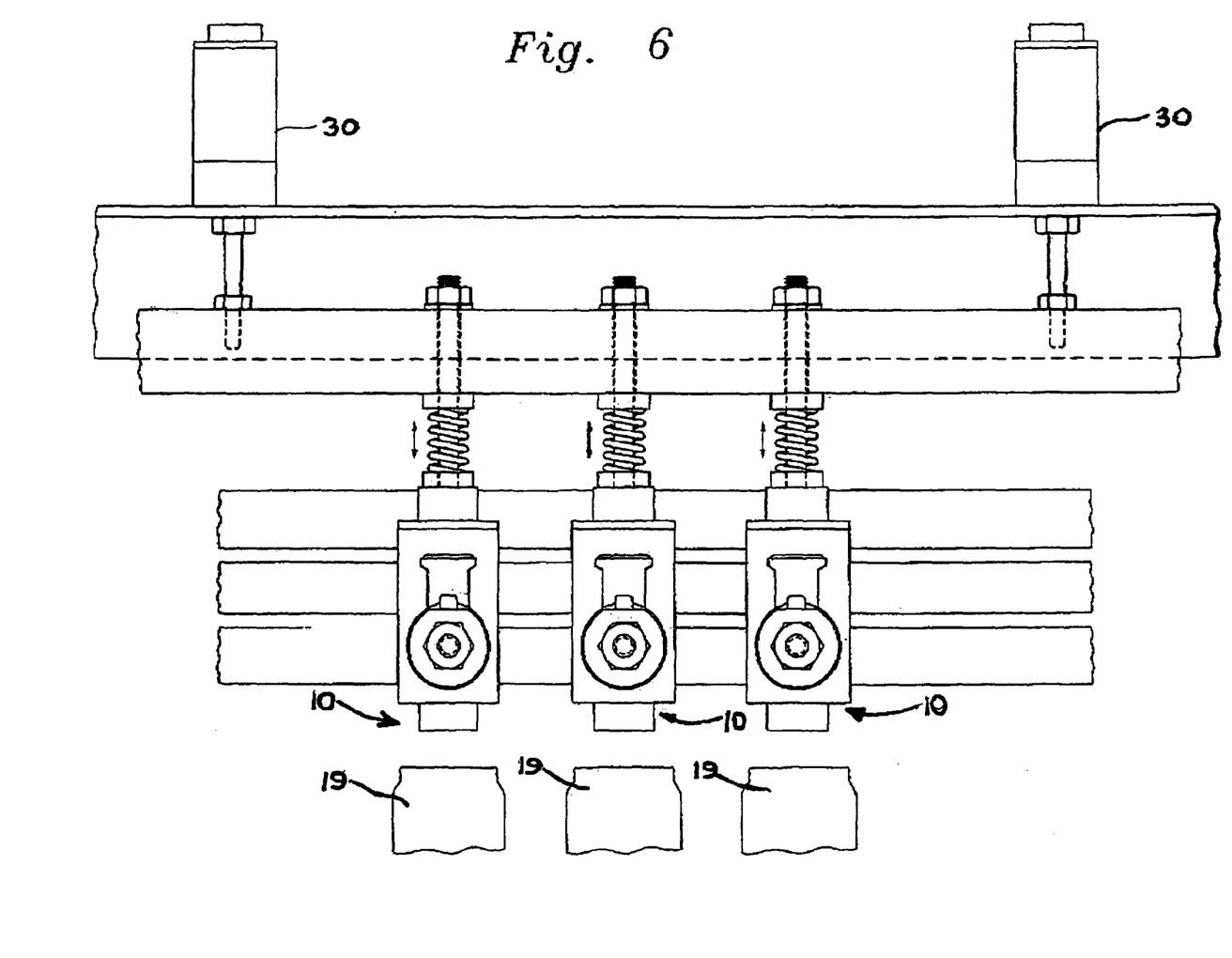
FIG. 6 is a top view of a sanitary in-line filling assembly having a plurality of individually-calibrated sanitary fill valves in accordance with FIG. 5.

As shown in FIGS. 5 and 6, in accordance with another embodiment of the invention, in order to provide enhanced dispensing speeds to and greater control of the fill valve assembly 10, the piston body 23 may be alternatively be actuated using a pneumatic actuator 30 connected in series and used in combination with a dampener mechanism such as a compression spring 32. In such a design, the compression spring 32 is received by a piston rod 22 which is threadingly attached to a connection block 33 via an adjustment nut 34, which also serves to adjust the compression of the spring 32. The pneumatic cylinder 30 is connected to an upper end of the block 33 via a thread 35 and nut 36 arrangement. The spring 32 is positioned between the upper end of the piston body 23 and the basal end of the block 33. The spring 32 preferably abuts the basal end of the block 33, and resistively dampens the retraction of the piston body 23 when the piston body is engaged in an open position. The spring 32 is preferably manufactured from a stainless steel. Turning the adjustment nut 34 either compresses or decompresses the spring 32 to respectively increase or decrease the sliding resistance of the piston body 21 when placed in an open or closed position. Such a design is also advantageous in dispensing the need for one-on-one actuation of the piston 20 during dispensation, thereby permitting a plurality of fill valves 10 to be actuated using a one or more actuators 30.

Typically, the piston body 21 operates at pressures from about 2 to 60 psi for rapidly dispensing a metered amount of the liquid product L into a container without splashing and/or dripping. While it is preferred that a pneumatic actuator is employed to drive the piston assembly, it is appreciated by those skilled in the art that alternative actuators may also be used.

In operation, the actuator 30 displaces the piston body 21 from an upward or first position which draws a predetermined volume of the liquid product L into the chamber 12 via negative pressure created therein. Relative to the varying physical characteristics (as temperature, viscosity, density, pumping pressure, etc.) of the liquid product L, the regulator body 41 adjusts the flow rate of the liquid product L by reducing and/or increasing the flow area into the chamber 12. Once the predetermined volume of liquid product L enters into the chamber 12, the actuator device 30 imparts a driving force sufficient to displace the piston 21 downwardly into the second position, thereby causing the liquid product L to be dispensed or discharged from the chamber 12 and into a vessel. Accordingly, the interaction between the piston assembly 20, actuator 30 and regulator 40 permits a rapid and precise metered amount of liquid product L to be dispensed into a vessel in a controlled manner.

Alternatively, a suitable timing and control system known in the art can be coupled to the actuator 30 and the regulator assembly 40 and utilized to selectively determine the volume of liquid product L to be drawn into the chamber 12 by displacing piston body 21 and the regulator body 41 a selected distance.

The fill valve and fill valve assembly in accordance with the present invention is advantageous over the prior art in being adaptable to rapidly and efficiently deliver or otherwise dispense and meter precise or uniform quantities of viscous flowable materials into an interior cavity of a vessel, container or the like, even under varying physical conditions of the dispensed viscous flowable material. The fill valve and fill valve assembly of the present invention is also advantageous in reducing turbulent flow to thereby permit dispensing of the viscous flowable material without unwanted splashing or gaseous bubble formation. The fill valve and fill valve assembly of the present invention is further advantageous in providing for efficient and quick dispensing operations in automatically regulating the rate of flow of dispensed viscous flowable materials. The fill valve and fill valve assembly of the present invention is even further advantageous in providing a sealed piston assembly which positively seals the piston within the housing while also cleaning-in-place the outlet passage to thereby reduce undesirable dripping of the dispensed viscous flowable materials.

It is apparent that innumerable variations of the preferred embodiments described hereinbefore may be utilized. However, all such variations within the spirit and scope of the invention are deemed to be covered by the following claims.

What is claimed is:

1. A sanitary fill valve assembly comprising:
   a housing having an inlet passage for receiving a viscous flowable material from a viscous flowable material source, an annular chamber for receiving the viscous flowable material from said inlet passage, and an outlet passage from which the viscous flowable material is dispensed;
   an ON/OFF positive controlled product dispenser including a piston cylinder for dispensing the viscous flowable material from said chamber, said piston cylinder having a main piston body and a piston head disposed at a distal end thereof for dispensing the viscous flowable product from said chamber; and
   a product flow regulator having a regulator body extending for longitudinal movement substantially perpendicular relative to said product dispenser, said inlet passage and said outlet passage and across the entire flow area at said inlet passage, said regulator body adjustably regulating the rate of flow of the viscous flowable material into said chamber and having a substantially tapered tip portion that combines with a corner sidewall portion of said inlet passage to create a flow passage through which the viscous flowable material flows into said annular chamber,
   wherein said housing has an annular surface with a tapered wall adjacent said outlet passage which forms a seat for said main piston body.

2. The assembly of claim 1, further comprising a seal mechanism for positively sealing said piston cylinder in said chamber.

3. The assembly of claim 2, wherein said seal mechanism comprises a first seal member, a second seal member and a third seal member.

4. The assembly of claim 3, wherein said first seal member is disposed on said piston head for cleaning-in-place said outlet passage to prevent dripping of the viscous flowable product during dispensation, said second sealing member being disposed intermediate said main piston body and said piston head for positively shutting off flow of the viscous liquid product during dispensation, and said third seal member being disposed adjacent said main piston body for preventing fluid leakage at a basal end thereof.

5. The assembly of claim 4, further comprising a drive mechanism for actuating said piston cylinder.

6. The assembly of claim 5, wherein said drive mechanism comprises a pneumatic cylinder.

7. The assembly of claim 1, wherein said product flow regulator comprises a regulator body, an adjustment mechanism for selectively displacing said regulator body within said housing between a downward position decreasing the flow area into said chamber and an upward position increasing the flow area into said chamber, and stop means for limiting the displacement of said product flow regulator.

8. The assembly of claim 7, wherein said adjustment mechanism comprises a threaded screw and an at least one adjustment nut, said threaded screw having a lower end connected to an upper portion of said regulator body and an upper end connected to said at least one adjustment nut, wherein rotation of said adjustment nut and said threaded screw causes to displace said elongated regulator body in a manner which at least one of increases and decreases the flow area at said inlet passage.

9. The assembly of claim 7, wherein said adjustment mechanism comprises an electric actuator.

10. A sanitary fill valve comprising: a housing having an inlet passage, an outlet passage and an annular chamber for receiving and dispensing a viscous flowable material; a product dispenser disposed within said chamber and adapted to reciprocate between a first position opening said chamber and a second position closing said chamber to dispense the viscous flowable material therefrom; a pneumatic actuator for displacing said product dispenser between said first and second positions; and a product flow regulator having a regulator body disposed intermediate of said inlet passage and said chamber and extending for longitudinal movement substantially perpendicular relative to said product dispenser, said inlet passage, said outlet passage and across the entire mouth of said inlet passage, wherein a distal end portion of said regulator body combines with said inlet passage to form a flow channel at the mouth of said inlet passage through which the viscous flowable material flows into said annular chamber, the width of said flow channel being automatically adjustable to regulate the flow rate of the viscous flowable material before entry into the annular chamber.

11. A sanitary fill valve for accommodating viscous flowable materials having different physical properties, said sanitary fill valve comprising:
    a valve housing having an inlet passage for receiving a viscous flowable material from a viscous flowable material source, an annular chamber in communication with said inlet passage, and an outlet passage in communication with said chamber for dispensing the viscous flowable material;
    a product dispenser disposed within said annular chamber for drawing the viscous flowable material into said chamber and dispensing the viscous flowable material from said chamber;
    a sealing mechanism for positively sealing said product dispenser within said chamber, wherein said sealing mechanism is also adapted to facilitate cleaning-in-place of said outlet passage during dispensation of the viscous flowable material; and
    a product flow regulator in communication with said inlet passage and said chamber for adjustably regulating the rate of flow of the viscous flowable material into said chamber by reducing and/or increasing a flow area into said chamber, wherein said product flow regulator is positioned in said valve housing such that it reciprocates in directions substantially perpendicular to said product dispenser, said inlet passage and said outlet passage and across the entire flow area at said inlet passage.

12. The valve of claim 11, wherein said product dispenser comprises a piston cylinder having a main piston body and a piston head disposed at a distal end thereof for dispensing the viscous flowable material from said chamber.

13. The valve of claim 12, wherein said piston head is provided with a pair of channels on an outer circumferential surface thereof for receiving a pair of seal members.

14. The valve of claim 13, wherein each of said seal members comprises an O-ring.

15. The valve of claim 14, wherein said product flow regulator comprises a cylindrical regulator body disposed adjacent said inlet passage and a regulator actuator for selectively displacing said regulator body between a first position decreasing the flow rate of the viscous flowable material into said chamber and an second position increasing the flow rate of the viscous flowable material into said chamber.

16. A process for hygienically filling a container with a viscous flowable material comprising the steps of:

provi­ding a housing having an inlet, an outlet and an annular chamber for receiving and dispensing the viscous flowable material, then;

pumping the viscous flowable material through said inlet into a said chamber of a housing, then;

providing a flow regulator between said chamber and said inlet and substantially perpendicular in relation to said inlet and said outlet and across the entire flow area at said inlet, then;

adjustably regulating the flow rate of the viscous flowable material at said inlet using said flow regulator based upon the physical properties of the viscous flowable material; and then dispensing the liquid product by pneumatically operating a drive device for reciprocating said product dispenser to a position closing said chamber.

17. The process of claim 16, further comprising the step of providing a seal mechanism for automatically cleaning-in place said chamber during said dispensing step.

* * * * *